United States Patent Office 3,072,372
Patented Jan. 8, 1963

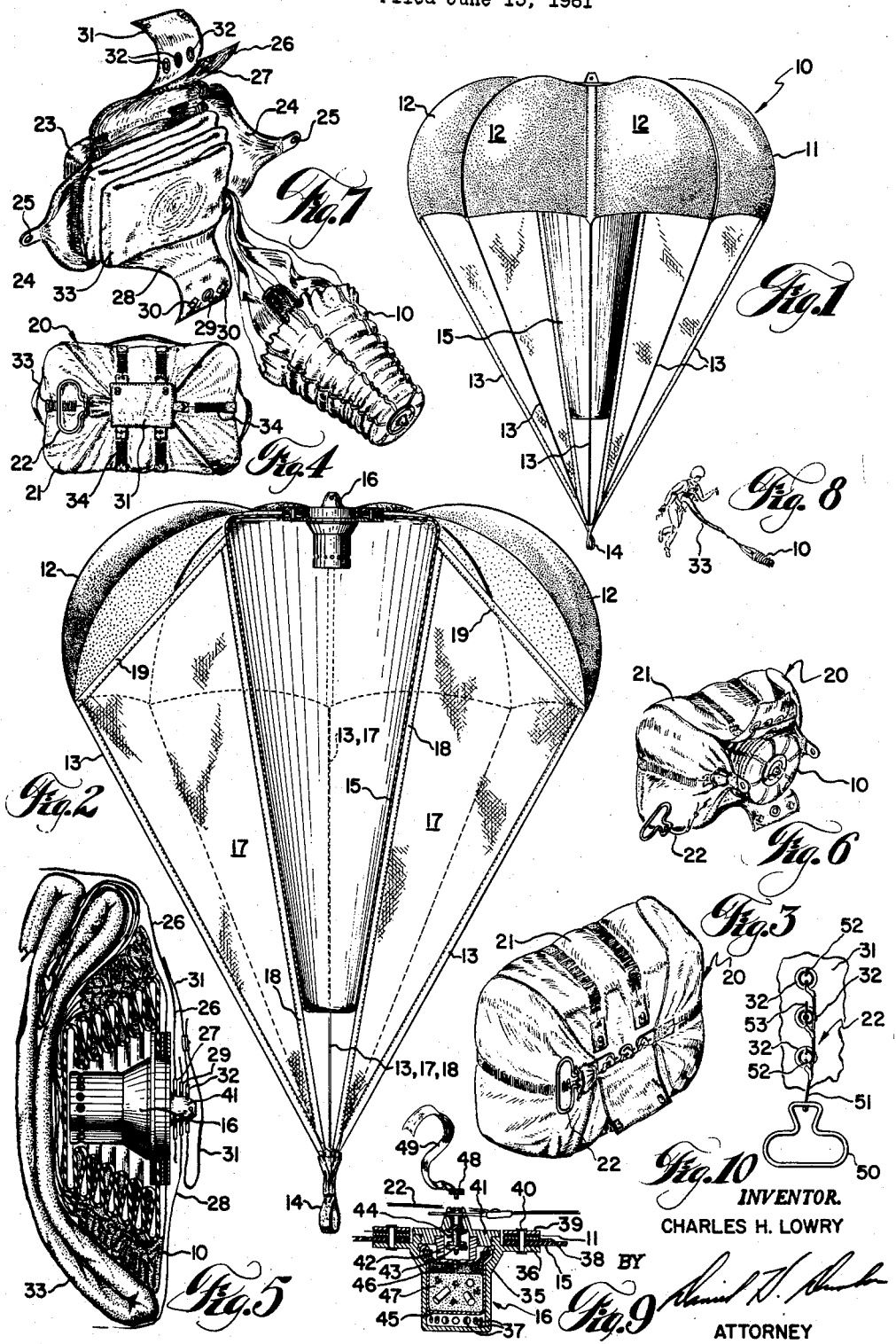

3,072,372
DEPLOYMENT PARACHUTE
Charles H. Lowry, Columbus, Ohio, assignor to
North American Aviation, Inc.
Filed June 15, 1961, Ser. No. 118,233
3 Claims. (Cl. 244—147)

This invention concerns an improved deployment parachute means and particularly relates to parachute means which may be used advantageously in connection with the deployment of personnel parachutes, aircraft ejection seat stabilization parachutes, and the like.

Experience has established that conventional spring-loaded deployment parachute means are frequently characterized by the presence of a hesitation or delay at that phase of their deployment operation which occurs immediately after deployment initiation. Such hesitations frequently have been observed to have a duration as high as 0.65 second and are critical in the case of aircraft ejection seat escape systems having a zero velocity, zero altitude capability. Deployment parachute hesitation is also recognized to be critical in nature as to certain troop operations and the like which involve the use of personnel parachutes.

In addition, known deployment parachute constructions which utilize ballistically propelled piston-components to deploy the parachute canopy portion have incorporated operating characteristics which are undesirable for many applications. In general, such operating deficiencies may arise out of the use of components or elements which are undesirable or which result in unnecessary and improperly distributed weight.

Experience has also established that the use of explosive charges to deploy a parachute canopy may give rise to possible or even probable damage to such canopy by reason of exposure to high-temperature gases.

The objects of my invention are achieved through providing, in a deployment parachute means, a generator means which develops a supply of high-temperature, pressurized gas upon initiation and which is combined with an inflation bladder means that is secured to the deployment parachute means canopy portion. A suitable container means and an initiator means are employed to house the novel deployment parachute prior to deployment and to initiate deployment in the improved manner.

An important object of this invention is to provide a deployment parachute means which may be used to effectively minimize hesitation or delay in the deployment operation associated therewith.

Another object of this invention is to provide an improved deployment parachute means which effectively minimizes the damping influence of associated parachute pack closure flaps and which overcomes the adverse effects of aerodynamic forces that frequently occur in the deployment operation.

A still further object of this invention is to provide a deployment parachute means which minimizes the weight requirements necessary to effectively deploy a parachute means in a forceful manner.

Another object of this invention is to provide a deployment parachute means which is not deflected, during the deployment operation, by flap components normally provided in accompanying containment structure.

Another object of my invention is to provide a deployment parachute means which utilizes contained high-temperature gases to effect canopy inflation in a manner which does not expose canopy fabric to damage by excessive heat.

A still further object of this invention is to provide a deployment parachute means which utilizes a deployment medium that has a high energy-storing capability.

Other objects and advantages of this invention will become apparent during consideration of the description and drawings.

In the drawings:

FIGURES 1 and 2 are elevation and sectional views, respectively, of the parachute means of this invention in a deployed condition;

FIGS. 3 through 5 illustrate details of a parachute pack assembly having the deployment parachute means of this invention contained therein;

FIGS. 6, 7, and 8 illustrate the improved deployment parachute means of this invention during phases of a deployment operation;

FIG. 9 is a sectional view through the initiator means assembly illustrated in FIGS. 2 and 3; and FIG. 10 provides details of the ripcord assembly employed in this invention.

A preferred embodiment of the deployment parachute means of this invention is referenced in the drawings by the numeral 10. Such parachute means includes the canopy 11 fabricated of joined gores 12, suspension lines 13 attached to canopy 11 and to attachment loop 14, inflation bladder means 15, and the initiator assembly referenced as 16. Gores 12 and suspension lines 13 are fabricated of conventional fabric materials. Inflation bladder means 15 is preferably fabricated of a neoprene-coated nylon fabric and is substantially non-porous. Bladder means 15 and the various suspension lines 13 are maintained in relative position to each other by the fabric webs 17, edge lines 18, and tie lines 19. A conventional sewing technique is employed to secure the various fabric components and line means to each other in proper relation.

It is preferred that deployment parachute means 10 be packed in a suitable containment structure, such as that illustrated in FIGS. 3 through 5, prior to and in preparation for deployment. The parachute assembly 20 illustrated in FIG. 3 typically includes a fabric container 21, a primary parachute having deployment parachute means 10 attached thereto, and ripcord assembly 22. Referring to FIGS. 4 and 5, container 21 includes a tray portion 23 having attached end flaps 24. Each end flap 24 includes a grommet device 25. The container tray portion 23 also includes the upper side flap 26 having grommet device 27 provided therein, and the lower side flap 28 having grommet device 29 and pierced locking cone fasteners 30 provided therein. In addition, container 21 includes attached cover flap 31 having grommet devices 32 provided therein. Snap fastener devices (not referenced) are provided in cover flap 31 for securing the cover flap in a folded position as shown in FIG. 5. In the assembled condition, upper side flap 26 and grommet 27 are first brought into contacting relation with the folded deployment parachute means 10 (FIG. 5). Grommet 27 is engaged with a cooperating portion of initiator means 16. Next, lower side flap 28 is placed over upperside flap 26 with the grommet device 29 located over the cone cap 41 of initiator means 16. End flaps 24 are then placed in position so that their grommet devices 25 cooperate with the locking cone fasteners 30 secured to lower side flap 28. The grommet devices 32 of cover flap 31 are then engaged with cone fasteners 30 and with the cone cap 41 of initiator means 16. Ripcord assembly 22 is then engaged with cone fasteners 30 and with cone cap 41 to secure pack 20 in its assembled condition. Afterwards, cover flap 31 may be folded and snapped into position as shown in FIG. 5. The parachute assembly 20 also includes a primary parachute such as that referenced by the numeral 33. Such paractute 33 may be either a personnel parachute, an escape system ejection seat stabilization parachute, or the like. Deployment parachute means 10 is folded in position and is attached to the canopy of parachute 33 by loop attachment 14. Also, tensioned elastic band devices 34 may be provided in each container flap in a conventional manner.

Details regarding initiator assembly 16 are provided in FIG. 9. Such assembly includes a housing 35 having a flange portion 36 and having gas passageways 37. Canopy 11 and inflation bladder means 15 are secured to flange 36 by spacer means 38, clamping ring 39, and fasteners 40. Initiator assembly 16 also includes pierced conical cap 41 in engaged and secured relation to housing 35. Cap 41 contains a firing pin assembly within the attached shell member 42. Such firing pin assembly consists of firing pin 43 and spring member 44. It is preferred that the firing pin assembly be installed in the parachute pack in a spring-loaded condition. This condition, shown in FIG. 9, is maintained by a locking pin of ripcord assembly 22 until deployment initiation is desired. Housing 35 also contains a conventional cartridge means 45 having a primer cap 46 and an explosive charge 47. Cartridge 45 is contained in housing 35 in aligned relation with the firing pin assembly. When ripcord assembly 22 is properly actuated, firing pin 43 is urged by spring 44 into contacting relation with the cartridge means primer cap 46 and operates to ignite explosive charge 47. High-temperature, high-pressure gases are generated by explosive charge 47 and are ported through passageways 37 into the interior of inflation bladder means 15. Such action causes bladder means 15 to rapidly inflate to the condition shown in FIGS. 1, 2, 7, and 8. It should be noted that inflation bladder means 15 is generally of conical shape and is arranged with its base portion located adjacent and in centered relation to canopy 11.

Details regarding ripcord assembly 22 are provided in FIG. 10. Such assembly consists of grip 50, attached cable 51, and cooperating swaged locking pins 52 and 53. Locking pin 53 is preferably of greater length than each locking pin 52 and is withdrawn from initiator means 16 only after each locking pin 52 has been withdrawn from its cooperating locking cone fastener 30. If desired, ripcord assembly 22 may be temporarily secured in position by a manually severable safety wire component.

A headed screw device 48 that cooperates with the end of firing pin 43 may be provided to facilitate installation of initiation means 16 into the parachute assembly 20. A warning flag 49 is provided to alert personnel to the required removal of headed screw 48 after locking pin 53 is installed in position.

Although not shown, the deployment means 15, 16 illustrated in the drawings may be backed up by a conventional spring means such as the spring used in state-of-the-art deployment parachutes. In such situations it is desirable that suitable flapper valves be provided in inflation bladder means 15 in order that such bladder means might not restrict parachute deployment by the conventional spring component.

It is to be understood that the forms of the invention herewith shown and described are to be taken as preferred embodiments of the same, but that various changes in the shape, size, and arrangement of parts may be resorted to without departing from the spirit of the invention or the scope of the subjoined claims.

I claim:
1. In a deployment parachute, in combination: a canopy means having suspension lines and attachment means connected thereto, initiator means carried by said canopy means at the center portion thereof for developing forces to deploy said canopy into an airstream, explosive charge means in said initiator means for generating high-temperature, high-pressure gases, and inflatable bladder means for confining gases generated by said explosive charge means in a non-contacting relation to said canopy means, said inflatable bladder means having an elongated configuration when inflated and having one end located at the underside center region of said canopy means to receive high-temperature, high-pressure gases generated by said explosive charge means to thereby deploy said canopy means from a packed condition into an airstream.

2. The invention defined by claim 1, wherein said inflatable bladder means is provided with a generally conical shape having a base portion, said conical shape base portion being located adjacent and in centered relation to said canopy means.

3. A parachute pack which comprises: cover means having a tray portion and flap portions attached to the tray portion, main parachute means contained within said cover means, deployment parachute means contained within said cover means in attached relation to said main parachute means and located generally intermediate said main parachute means and said flap portions, and deployment means having an inflatable, conical-shaped bladder attached to said deployment parachute means in centered relation thereto and having an explosive cartridge which cooperates with said inflatable bladder means and which generates high-temperature, high-pressure gases to expand said inflatable bladder when initiated, said conical-shaped inflatable bladder being folded so that the base and apex portions thereof are located in opposed relation and so that the conical surface portion thereof is positioned in surrounding relation to said explosive cartridge whereby said deployment parachute means is moved in a direction generally normal to said main parachute means when said inflatable bladder means is inflated by actuation of said explosive cartridge.

References Cited in the file of this patent

UNITED STATES PATENTS

| 2,718,369 | MacMillan | Sept. 20, 1955 |
| 2,967,685 | Mognuson | Jan. 10, 1961 |

FOREIGN PATENTS

| 26,745 | Denmark | Oct. 4, 1920 |